United States Patent [19]

Doucet

[11] Patent Number: 5,560,847
[45] Date of Patent: Oct. 1, 1996

[54] ENVIRONMENTAL PROTECTION OF A PIPE BY MEANS OF A CONDUCTIVE POLYMER SHEET

[75] Inventor: Jozef A. G. Doucet, Kessel-Lo, Belgium

[73] Assignee: NV Raychem SA, Kessel-Lo, Belgium

[21] Appl. No.: 313,084

[22] PCT Filed: Mar. 31, 1993

[86] PCT No.: PCT/GB93/00670

§ 371 Date: Sep. 29, 1994

§ 102(e) Date: Sep. 29, 1994

[87] PCT Pub. No.: WO93/19925

PCT Pub. Date: Oct. 14, 1993

[30] Foreign Application Priority Data

Apr. 1, 1992 [GB] United Kingdom .................. 9207175

[51] Int. Cl.[6] ..................................................... H05B 3/58
[52] U.S. Cl. ............................................. 219/535; 219/541
[58] Field of Search ................................. 219/535, 544, 219/541, 543

[56] References Cited

U.S. PATENT DOCUMENTS

| | | | |
|---|---|---|---|
| 4,252,849 | 2/1981 | Nishimura et al. | 219/535 |
| 4,369,356 | 1/1983 | Tsurutani et al. | 219/535 |
| 4,428,790 | 1/1984 | Diaz | 156/86 |
| 4,675,512 | 6/1987 | Doucet | 219/535 |
| 4,906,427 | 3/1990 | Van Loo et al. | 219/535 |
| 4,954,670 | 9/1990 | Jensen et al. | 219/535 |
| 5,003,163 | 3/1991 | Jensen | 219/535 |

FOREIGN PATENT DOCUMENTS

| | | | |
|---|---|---|---|
| 0117762 | 9/1984 | European Pat. Off. | H02G 15/18 |
| 0239377 | 9/1987 | European Pat. Off. | B29C 61/10 |
| 0307205 | 4/1994 | European Pat. Off. | B29C 61/06 |
| 1183335 | 7/1959 | France . | |

OTHER PUBLICATIONS

International Search Report for PCT/GB93/00670.
Patent Abstracts of Japan, Aug. 19, 1987, abstract of Japanese Patent Publication No. 62733/1987 (Somar Corp.).
Patent Abstracts of Japan, vol. 8, No. 146 (M–307) (1583), Jul. 7, 1984, abstract of Japanese Patent Pubication No. 42920/1984 (Kiyoo raku K.K.).

*Primary Examiner*—Teresa J. Walberg
*Assistant Examiner*—Sam Paik
*Attorney, Agent, or Firm*—Marguerite E. Gerstner; Herbert G. Burkard

[57] ABSTRACT

A conductive polymer wraparound sleeve is used to enclose a joint between district heating pipes. It is wrapped so that longitudinal edges thereof overlap, and it acts as a source of heat to seal the overlapping longitudinal edges. Elongate electrodes, preferably metal bars provided on a carrying strip, are positioned along the overlap and connected to a power source to cause electrical current to flow circumferentially across the overlap region to cause bonding of the overlap.

15 Claims, 2 Drawing Sheets

ENVIRONMENTAL PROTECTION OF A PIPE BY MEANS OF A CONDUCTIVE POLYMER SHEET

FIELD OF THE INVENTION

The present invention relates to environmental protection and/or mechanical joining of pipes or cables, particularly thermally-insulated pipes such as district-heating pipes.

SUMMARY OF THE INVENTION

The present invention in one embodiment provides the use of a conductive polymer backing sheet in the environmental protection of a thermally-insulated pipe to enclose the pipe and to act as a source of heat to seal overlapping longitudinal edges of the sheet.

In another embodiment the invention provides a method of sealing an elongate object which comprises: wrapping a sheet comprising a conductive polymer backing sheet and a bonding layer around the object so that longitudinal edges thereof overlap over a longitudinal region; pressing two electrodes into contact with the sheet so that they extend substantially parallel to each other along opposite edge portions of the sheet; and powering the electrodes to cause electrical current to flow across the region to fuse the bonding layer.

DETAILED DESCRIPTION OF THE INVENTION

The product consists of a heat-shrink backing, shrink ratio preferably from 10–50%, for example about 20%. The backing may be electrically conductive with a resistivity around 1–10 ohm-cm, especially from 2–6 ohm-cm. Preferably the material comprises a conductive polymeric material. A conductive polymeric material is a composition comprising a conductive filler, typically carbon black, distributed in a polymer, tyrpically an organic polymer. The filler is preferably provided in an amount of 20–60 parts by weight. The polymer may be for example polyethylene or EVA. A preferred material is 100–500%, particularly 300%, expanded, 0.75–2.5, particularly 1.5, mm thick sheet made in polyethylene or EVA 30–50%, particularly 39%, carbon filled.

The product is wraparound and can be supplied on the roll or cut to length in the field or elsewheter. The product can replace oversized casings used in district heating joints.

The product can be installed over a cut back between two joined district heating pipes. A support plate or profile can be installed in the cut back area. This plate can support a longitudinal seal formed during installation of the new sheet.

The sheet can be wrapped around the cut back and closed with a cotton Tessa or other suitable tape.

Two metal bars, e.g. aluminium bars, may be used as electrodes. These are typically spaced at 25–45, particularly about 35, mm with electrical isolators. The electrodes are positioned over an overlap of ends of the sheet and optionally over a metal or other support. They may be kept in position by, for example two straps or clamps, etc. These clamps are preferably positioned over the pipe section, rather than over the cut back area. Another possibility is to provide the electrodes fixed on a backing sheet, so that this provides a separate integral powering device that can be strapped to the sheet to power and heat the overlap region, and then optionally removed. Instead of aluminium bars the electrodes may comprise, for example, electrically conductive braids, or other strips.

The product can be installed with a constant wattage or other power supply, preferably at a power density of 1.5–3, especially about 2.4, Watt/cm$^2$.

Application of power causes electrical current to flow circumferentially, primarily across the overlap region.

No extra pressure need be applied during installation. A surface type thermocouple may be used to regulate the temperature (preferably about 155° C.) during installation for a certain dwell time (preferably about 60 secs). Circumferential seals can be installed after cool down of the longitudinal seal.

Any excess amount of material can be cut away next to the electrode of the longitudinal seal together with the closing Tessa tape, and, as mentioned above, the electrode optionally removed. A piece of electrical insulation tape may be glued on the overlap to prevent re-heating of the longitudinal seal during separate installation of circumferential seals of the sleeve to the pipe jackets, which is usually carried out. Two Jubilee or other clamps may be used as electrodes. The clamps may be spaced about 35 mm apart. The gaps between the clamps and the sleeves at the overlap may be filled with metal braid material to reduce contact resistance.

The electrodes may powered with a constant or other wattage supply, preferably about 2–4 Watt/cm$^2$ power density.

The electrodes may be re-used after installation, as indicated, if removed.

BRIEF DESCRIPTION OF THE DRAWING

The invention is further illustrated, by way of example, with reference to the accompanying drawings, in which.

DETAILED DESCRIPTION OF THE DRAWINGS

Figure 1:
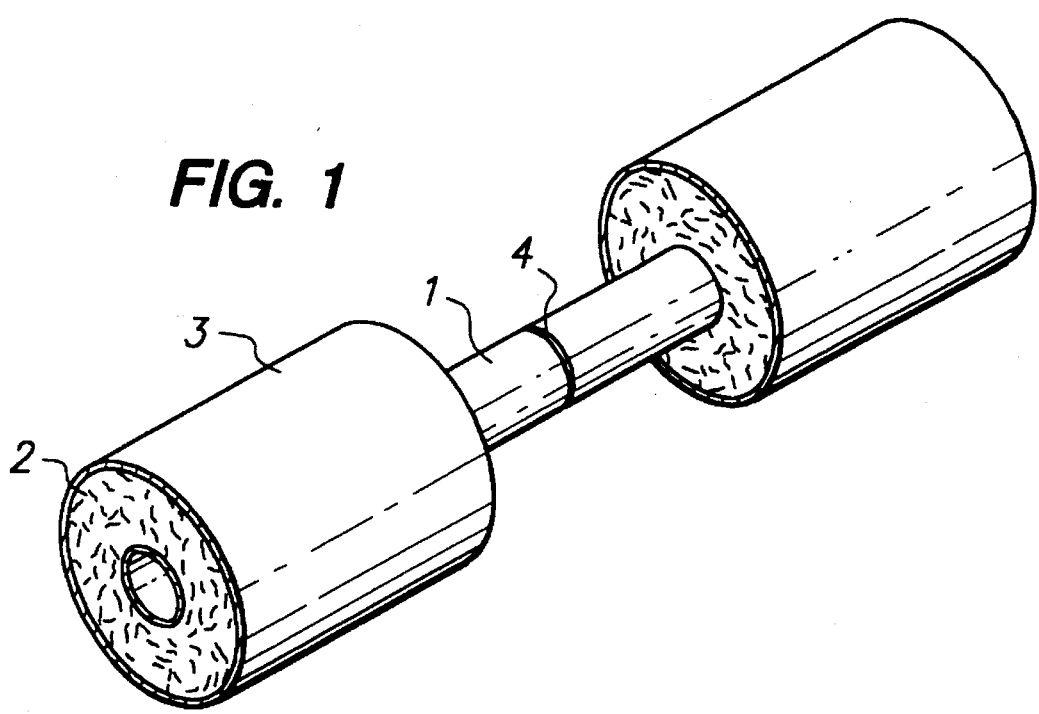
FIG. 1 shows a joint between district heating pipes.

In FIG. 1 two pipes, for example for conveying hot water for district heating, etc., are surrounded by thermal or other insulation 2 which in turn is surrounded by a protective jacket 3. Two such pipes are joined by a weld 4. In order to make such a joint, the insulation 2 and jacket 3 of each pipe have to be cut back as shown.

The cut-back jacket has to be made good in order to protect the otherwise-exposed insulation. Also, new insulation may be required to be located at the join.

Figure 2:
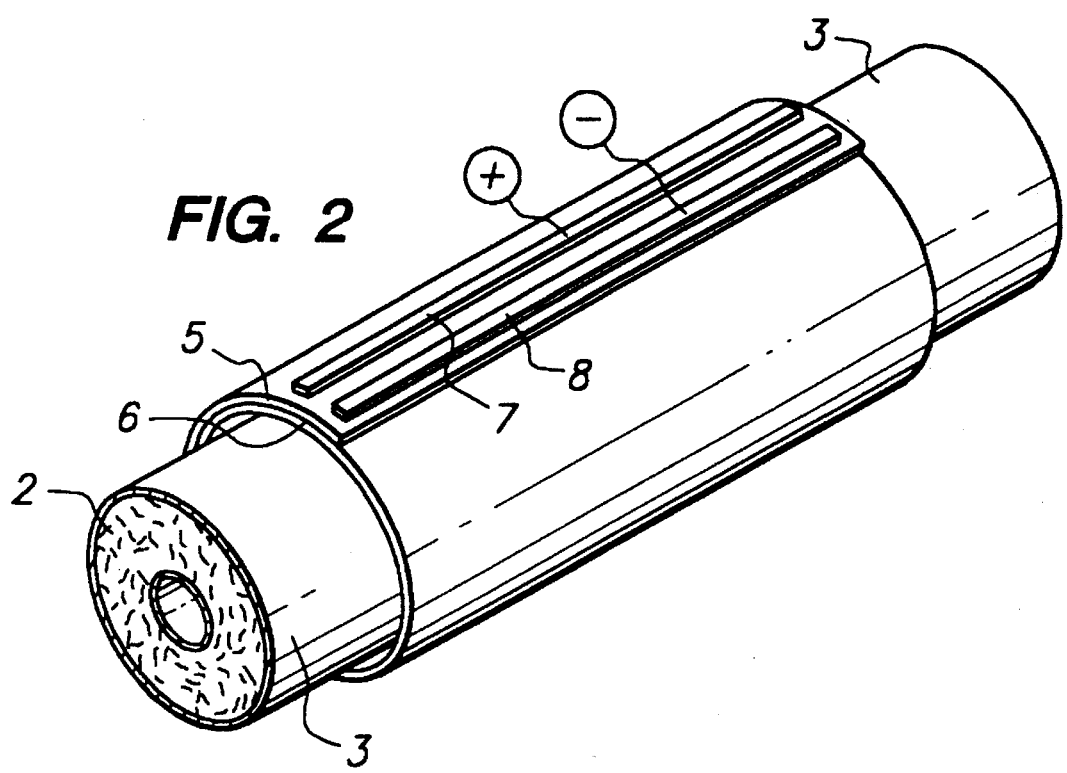
FIG. 2 shows such a joint enclosed by a new sheet of the invention.

FIG. 2 shows a sheet 5 of the invention being installed by a method of the invention.

Longitudinal edges of the sheet can be seen to overlap at 6.

Metal or other electrodes 7 and 8 are placed on the overlap, and when powered cause the overlap to be sealed. Shrinkage of the sleeve may also occur. Circumferential seals to the cut-back pipe jackets 3 may be made in a similar way if desired.

Instead of using two separate electrodes, a single (integral) device may be placed on the overlap to power the sheet. Such a device is shown in FIG. 3, and comprises a backing sheet 9 and mounted electrodes 7 and 8 secured thereto.

Figure 4:
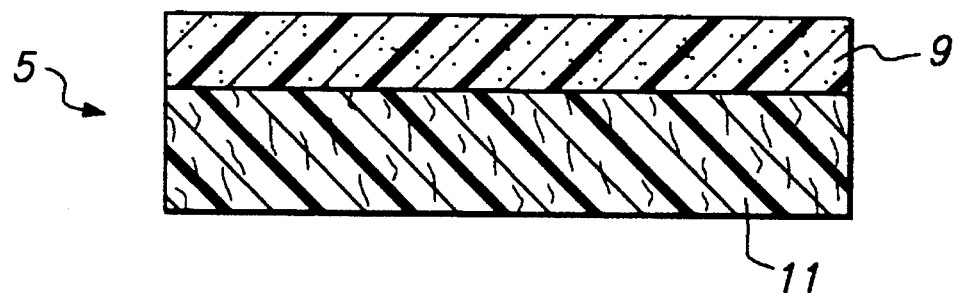
FIG. 4 shows in cross-section a sheet of the invention.
Figure 5:
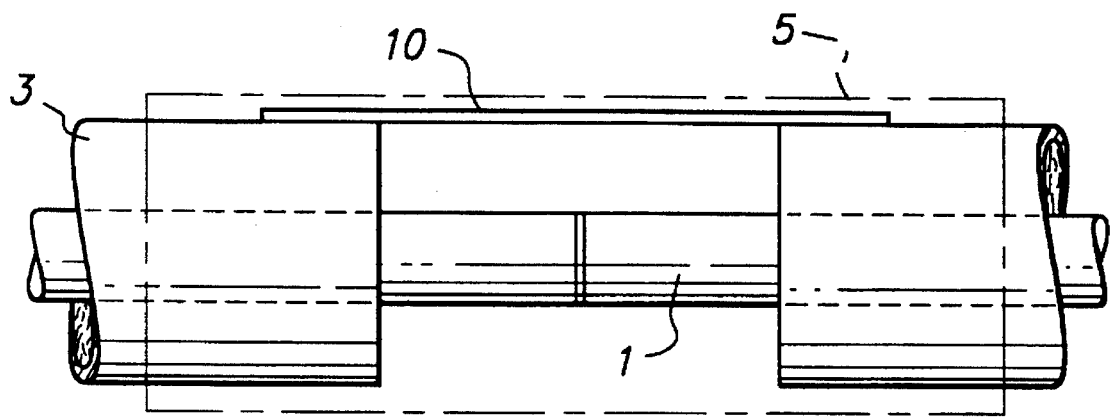
FIG. 5 shows a support bar installed on a pipe joint prior to installation of a sheet.

The sheet may comprise a conductive polymer material and therefore be self-heating. It may weld together Under the action of heat, but I prefer that it be coated with a suitable heat-activatable sealing material. The sealing material may be reinforced, for example with a fiber reinforcement, e.g. glass fiber. This can provide both strength and electrical insulation (to prevent any possible short circuiting via the pipe). Other lining electrical insulating layers may also be used. As shown in FIG. 4, a sheet 5 of the invention can be prepared in which conductive polymer backing sheet 9 is coated with layer 11 of heat-activated sealing material reinforced with fibers. Layer 11 serves as a bonding layer.

Figure 3:
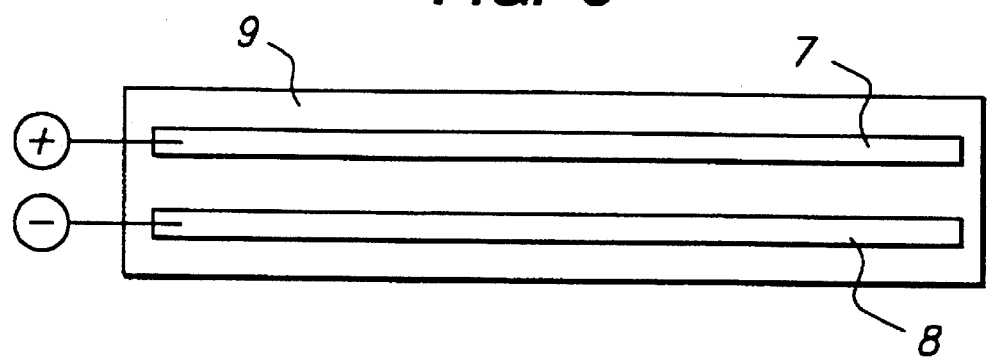
FIG. 3 shows an electrode for use in a new method of the invention.

In order to provide support for the electrodes a support bar 10 may be installed bridging the insulated parts of the pipes as shown in FIG. 3.

Since current flows circumferentially between the electrodes, substantially no heat will be produced directly under the electrodes. Even though excessive pressure on the electrodes is not required in order to achieve good electrical contact, this lack of heat beneath the electrodes themselves reduces damage to underlying cable jackets. Also due to the much greater resistance in the longer current path from one electrode to the other around the larger of the two segments of the pipe, virtually all of the heat will be generated where it is needed, i.e. at the overlap region. The sleeve is shown of considerably greater diameter than the pipe jacket, and it may be heat-shrinkable and shrink into engagement with the jacket on installation. An advantage, however, of the wrap-around nature of the preferred sheets of the invention is that they can if desired be cut to length and/or an overlap can be made of such a size that the sleeve is substantially tight around the pipes before heating. Shrinkage is not then necessary, although a small amount may still be beneficial.

Any suitable conductive polymer or other material may be used for the sheet. Particularly preferred compositions are those especially suitable for use in self-bearable heat recoverable articles. Particularly good examples are described in European Patent Publication Nos. 307,207 and 307,205.

Preferred compositions preferably exhibit a small increase in resistivity on increase in temperature, that is a so-called pseudo PTC effect. The term "pseudo" is used since although there is an increase in resistivity it is significantly less than that exhibited by materials traditionally referred to as PTC, and is not to be confused therewith. The composition is selected such that the pseudo PTC effect:

(a) encourages uniform heating of an article, electroded and powered to recovery;

(b) moderates the problem of runaway heating seen with ZTC materials; and (c) is not sufficiently PTC to invoke hot-lining, even when the article is laminar and is powered so that current flows substantially parallel to the faces of the article.

Preferably the pseudo PTC ratio, (as hereinafter defined) of the recoverable material is in the range 1.5 to 50 more preferably in the range 1½ to 10, preferably in the range 2.5 to 5, especially 3. The preferred PTC ratios are especially preferred for materials that have been expanded 25%–500% (1.25X–6X), especially 25%–300% (1.25X–4X), more especially 50%–150% (1.5X–2.5X).

As described before where a material exhibits a PTC effect it exhibits a curl over effect, that is it reaches a peak after which the resistivity/temperature curve changes its slope. After the peak the curve may decrease in slope, level-off, or fall in resistivity, sometimes with a subsequent rise in resistivity. For the pseudo -PTC materials defined herein, the pseudo PTC ratio is defined as the ratio of the "peak" resistivity to the resistivity at 25° C. of the material. The peak resistivity is the highest resistivity where curl-over with a decrease in resistivity occurs (referred to herein as negative curl-over), or the point of inflection, where a subsequent rise occurs (referred to herein as positive curl-over).

Compositions according to the invention are preferably melt processed.

Resistivity/temperature curves by which the quoted pseudo PTC ratio measurements are calculated are obtained using the method set out in European Patent Publication No. 307,205.

Preferred compositions preferably also have a resistivity measured at any particular temperature that increases on recovery. This resistivity increase occurs at any given temperature in the range 20° C. to $T_e$ (where $T_e$ is the extrapolated end temperature as measured according to ASTM D3418-82). This resistivity increase is additional to any resistivity change that occurs on recovery as a result of the pseudo PTC effect. The resistivity change is believed to result from changes in the conductive particle network formed by the filler particles in the composition during the recovery process. When the composition is used in a recoverable article this increase in resistivity on recovery, in addition to the pseudo PTC effect tends to shunt current away from the first or more recovered parts during the recovery process.

Preferred articles according to the invention comprise a laminar article at least part of which has been expanded from X% to Y% to make it heat recoverable, the article comprising a conductive polymeric material the resistivity of which decreases on expansion, as measured in the direction of current flow, in at least part of the X–Y% expansion range. X may be zero or finite, and Y is greater than X.

Preferred conductive polymeric compositions according to the invention are cross linked for example by irradiating with high energy electrons to a beam dose in the range 2–35 MRads, especially 2–25 MRads, for example 10 to 15 MRads. Cross-linking enhances the recoverable behavior of the material.

The entire disclosure of the patent publications referred to herein are incorporated herein by reference.

What is claimed is:

1. A method of environmentally protecting a thermally-insulated pipe, said method comprising (a) enclosing the pipe with a conductive polymer backing sheet which comprises electrodes to give an overlap between longitudinal edges of the sheet, (b) positioning the electrodes over said overlap so that electrical power can be applied through the electrodes between two regions of the sheet that (i) each extend substantially longitudinally along the sheet and (ii) substantially enclose at least part of the overlap; and (c) connecting electrical power to said electrodes to generate heat to seal the overlap between the longitudinal edges of the sheet.

2. A method according to claim 1, wherein the sheet is coated with a heat-activatable sealing material that can be activated by heat generated within the sheet thereby forming the seal.

3. A method according to claim 2, wherein the sealing material is reinforced.

4. A method according to claim 3, wherein the sealing material comprises a fiber-reinforced fusion layer.

5. A method according to claim 1, wherein the sheet is heat-shrinkable.

6. A method according to claim 5 wherein heat generated within the sheet causes the sheet to shrink.

7. A method according to claim 1 wherein the pipe is a district-heating pipe.

8. A method according to claim 1, wherein the electrodes are placed over an outwardly-facing surface of an edge of the sheet.

9. A method of sealing an elongate object which comprises:
   (1) wrapping a sheet comprising a conductive polymer backing sheet and a bonding layer around the object so that longitudinal edges of the sheet overlap over a longitudinal region;
   (2) pressing two elongate electrodes into contact with the sheet so that they extend substantially parallel to each other along longitudinal edge portions of the sheet; and
   (3) applying electrical power to the electrodes to cause electrical current to flow across the region to fuse the bonding layer.

10. A method of sealing an elongate object which comprises,
   (1) providing a sheet comprising a conductive polymer backing sheet and a bonding layer around the object so that longitudinal edges of the conductive polymer backing sheet overlap over a longitudinal region;
   (2) pressing two elongate electrodes which are secured to an elongate backing sheet to form an integral device into contact with the conductive polymer backing sheet so that the electrodes extend substantially parallel to each other along longitudinal edge portions of the sheet; and
   (3) applying electrical power to the electrodes to cause electrical current to flow across the region to fuse the bonding layer.

11. A method according to claim 9 wherein the elongate backing sheet is removed after power is applied to the electrodes.

12. A method of environmentally protecting a thermally-insulated cable, said method comprising
   (a) enclosing the cable with a conductive polymer backing sheet which comprises electrodes to give an overlap between longitudinal edges of the sheet,
   (b) positioning the electrodes over said overlap so that electrical power can be applied through the electrodes between two regions of the sheet that (i) each extend substantially longitudinally along the sheet and (ii) substantially enclose at least pan of the overlap; and
   (c) connecting electrical power to said electrodes to generate heat to seal the overlap between the longitudinal edges of the sheet.

13. A method according to claim 12, wherein the sheet is coated with a heat-activatable sealing material that can be activated by heat generated within the sheet thereby forming the seal.

14. A method according to claim 13, wherein the sealing material is reinforced.

15. A method according to claim 12, wherein the sheet is heat-shrinkable.

* * * * *